(12) United States Patent
Mann et al.

(10) Patent No.: US 9,983,497 B2
(45) Date of Patent: *May 29, 2018

(54) LIQUID ELECTROPHOTOGRAPHIC INK COMPOSITION

(71) Applicant: HP Indigo B.V., Amstelveen (NL)

(72) Inventors: Adi Mann, Rishon le-zion (IL); Albert Teishev, Rishon le-zion (IL); Eyal Handel, Timrat (IL); Marc Klein, Tel Aviv (IL); Olga Kagan, Ashdod (IL); Yaron Grinwald, Meitar (IL); Vladislav Kaploun, Rehovot (IL)

(73) Assignee: HP Indigo B.V., Amstelveen (NL)

(*) Notice: Subject to any disclaimer, the term of this patent is extended or adjusted under 35 U.S.C. 154(b) by 0 days. days.

This patent is subject to a terminal disclaimer.

(21) Appl. No.: 15/329,047

(22) PCT Filed: Jul. 29, 2014

(86) PCT No.: PCT/EP2014/066292
§ 371 (c)(1),
(2) Date: Jan. 25, 2017

(87) PCT Pub. No.: WO2016/015755
PCT Pub. Date: Feb. 4, 2016

(65) Prior Publication Data
US 2017/0227877 A1    Aug. 10, 2017

(51) Int. Cl.
| G03G 9/12 | (2006.01) |
| G03G 9/125 | (2006.01) |
| G03G 9/13 | (2006.01) |
| G03G 9/08 | (2006.01) |
| G03G 9/135 | (2006.01) |

(52) U.S. Cl.
CPC ............ *G03G 9/125* (2013.01); *G03G 9/081* (2013.01); *G03G 9/0804* (2013.01); *G03G 9/0812* (2013.01); *G03G 9/0815* (2013.01); *G03G 9/0819* (2013.01); *G03G 9/122* (2013.01); *G03G 9/131* (2013.01); *G03G 9/135* (2013.01)

(58) Field of Classification Search
CPC ........ G03G 9/125; G03G 9/131; G03G 9/135; G03G 9/122
USPC ............................................. 430/137.22, 114
See application file for complete search history.

(56) References Cited

U.S. PATENT DOCUMENTS

| 5,270,445 | A | 12/1993 | Hou |
| 5,387,489 | A | 2/1995 | Fuller et al. |
| 6,143,402 | A | 11/2000 | Reisacher et al. |
| 6,174,640 | B1* | 1/2001 | Lawson ............... C08G 81/024 430/115 |
| 6,511,534 | B1 | 1/2003 | Mishina et al. |
| 6,828,358 | B2 | 12/2004 | Morrison et al. |
| 6,924,035 | B2 | 8/2005 | Auweter et al. |
| 7,060,408 | B2 | 6/2006 | Qian et al. |
| 7,074,843 | B2 | 7/2006 | Nakamura et al. |
| 7,307,110 | B2 | 12/2007 | Yatake |
| 7,332,532 | B2 | 2/2008 | Vasudevan |
| 7,407,706 | B2 | 8/2008 | Miyabayashi et al. |
| 7,439,281 | B2 | 10/2008 | Ushirogouchi et al. |
| 7,479,323 | B2 | 1/2009 | Rathschlag et al. |
| 9,823,597 | B2 | 11/2017 | Mann et al. |
| 2001/0038962 | A1* | 11/2001 | Landa ...................... G03G 9/09 430/114 |
| 2008/0299481 | A1 | 12/2008 | Akioka |
| 2011/0091798 | A1* | 4/2011 | Victor .................... G03G 17/02 430/32 |
| 2011/0217650 | A1 | 9/2011 | Mor et al. |
| 2012/0114378 | A1 | 5/2012 | Golodetz et al. |
| 2013/0288176 | A1 | 10/2013 | Ganapathiappan et al. |

FOREIGN PATENT DOCUMENTS

| DE | 2020812 | 11/1971 |
| GB | 1588777 | 4/1981 |
| JP | S62280755 | 12/1987 |
| JP | H10288865 | 10/1998 |
| WO | WO-2011/009488 A1 | 1/2011 |
| WO | WO2014/012597 A1 | 1/2014 |

OTHER PUBLICATIONS

International Search Report and Written Opinion for International Application No. PCT/EP2014/066292 dated Oct. 13, 2014, 10 pages.

* cited by examiner

*Primary Examiner* — Janis L Dote
(74) *Attorney, Agent, or Firm* — Dierker & Kavanaugh, P.C.

(57) ABSTRACT

A method for coating pigment particles is provided, the method comprising heating a polymer resin in a carrier fluid to dissolve the polymer resin, suspending in the carrier fluid the pigment particles to be coated; and effecting precipitation of the polymer resin from the carrier fluid, such that a coating of the resin is formed on the pigment particles.

12 Claims, 2 Drawing Sheets

LIQUID ELECTROPHOTOGRAPHIC INK COMPOSITION

BACKGROUND

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

Many substrates are white, so the four main printing inks cyan, magenta, yellow and black (CMYK) are used, but for non-white substrates, white printing inks are used.

DETAILED DESCRIPTION

Figure 1A:
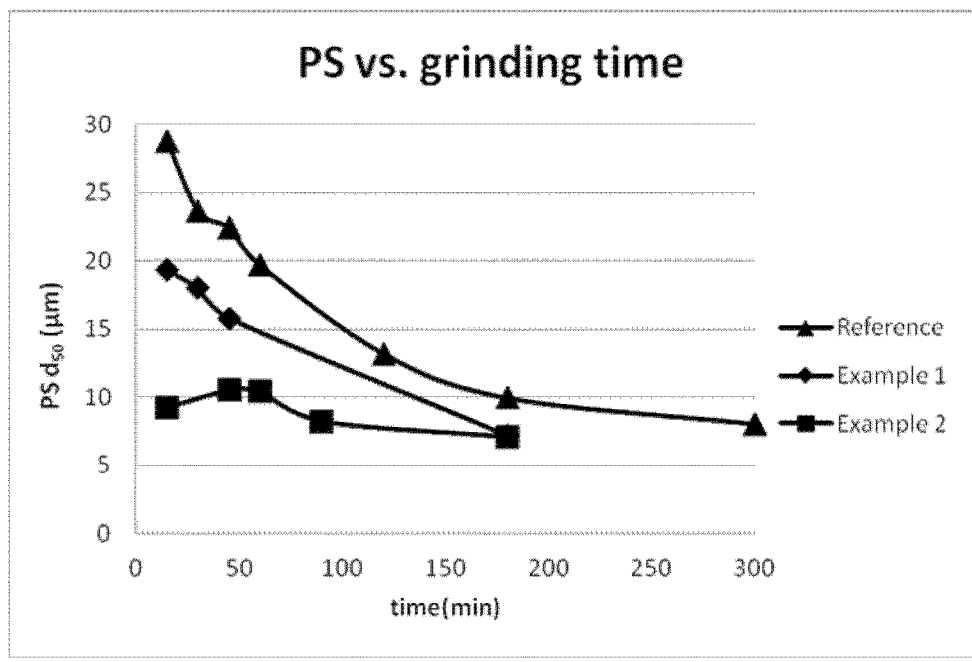
FIG. 1(a) shows the particle size distributions versus grinding time of Examples 1 and 2 against a reference example.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise pigment particles, which may comprise a thermoplastic resin.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400V/μm, or more, ins some examples 600-900V/μm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a method of producing a white liquid electrophotographic ink composition, the method comprising:
heating a polymer resin in a carrier fluid to dissolve the polymer resin;
suspending in the carrier fluid white pigment particles to be coated; and
controlling cooling of the carrier fluid to effect precipitation of the polymer resin from the carrier fluid such that a coating of the resin is formed on the pigment particles, thereby producing the white liquid electrophotographic ink composition.

In another aspect there is provided a white liquid electrophotographic ink composition producible in accordance with a method comprising:
heating a polymer resin in a carrier fluid to dissolve the polymer resin;
suspending in the carrier fluid white pigment particles to be coated; and
controlling cooling of the carrier fluid to effect precipitation of the polymer resin from the carrier fluid such that a coating of the resin is formed on the pigment particles, thereby forming the white liquid electrophotographic ink composition.

In another aspect there is provided a white liquid electrophotographic ink composition, the composition comprising:
a carrier fluid; and
white pigment particles having a polymer resin coating thereon; wherein the polymer resin coated white pigment particles have a median particle size ($d_{50}$) of less than 20 μm after grinding for 45 minutes at 40° C., 250 rpm, and 18% non-volatile solids content.

Much research has been carried out in recent years to try to create a white electrostatic printing ink. Some electrostatic printing inks have been produced, e.g. by grinding a white pigment with a resin, sometimes in the presence of a liquid carrier. However, some of such inks have been found to have an insufficient and inconsistent white appearance, have a high level of background when printed, have increased tentacular shapes leading to increased ink concentration on the developer roller and greater wetness on the roller and increased energy consumption, increased VOC emission and a decrease in T2 quality. The present inventors have found that examples of the method as described herein avoid or at least mitigate at least one of the difficulties described above. They have found that examples of the method are more successful in encapsulating white pigment particles, and that the resulting pigment particles can be achieved via a more efficient and less energy intensive production process.

Pigment

Although a variety of pigments may be used, in one example the pigment is a white pigment particle. In some examples, the pigment particle may be selected from the group consisting of $TiO_2$, calcium carbonate, zinc oxide, and mixtures thereof, for example, the pigment may consist essentially of $TiO_2$. In some examples the pigment particle may be an alumina-$TiO_2$ pigment. A form for the $TiO_2$ may be selected from among rutile, anatase, brookite, and mixtures thereof, for example, the form may consist of rutile. The rutile form of $TiO_2$ exhibits the highest refractive index among the other forms of $TiO_2$ and the other listed pigments. All other parameters of inks being the same, the highest refractive index yields the highest opacity. Examples of pigment particles include SACHTLEBEN® R405 from Sachtleben, and TI-PURE® R900 from DuPont.

In some examples, the pigment particles are surface treated pigment particles. For example, the pigment particles may be organic surface treated or inorganic surface treated. In some examples, the pigment particles are surface treated to provide them with an increased hydrophobicity. In some examples, the pigment particles are surface treated with a modified polysiloxane to provide increased hydrophobicity.

In some examples, the pigment particles may have a median particle size or $d_{50}$ of less than 20 μm, for example less than 15 μm, for example less than 10 μm, for example less than 5 μm, for example less than 4 μm, for example less than 3 μm, for example less than 2 μm, for example less than 1 μm, for example less than 0.9 μm, for example less than 08 μm, for example less than 0.7 μm, for example less than 0.6 μm, for example less than 0.5 μm. Unless otherwise stated, the particle size of the pigment particle and the coated pigment particle is determined using laser diffraction on a Malvern MASTERSIZER® 2000 according to the standard procedure as described in the operating manual.

The pigment particle may be present in the method and/or electrostatic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and pigment. In some examples, the pigment particle may be present in the method and/or electrostatic ink composition in an amount of at least 50 wt % of the total amount of resin and pigment, for example at least 55 wt % of the total amount of resin and pigment.

Polymer Resin

The encapsulated particle can comprise a polymer resin. The polymer resin may comprise a thermoplastic polymer. A thermoplastic polymer is sometimes referred to as a thermoplastic resin. In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less. An example of the first polymer is NUCREL® 960 (from DuPont), and an example of the second polymer is NUCREL® 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the BYNEL® class of monomer, including BYNEL® 2022 and BYNEL® 2002, which are available from DuPont.

The polymer having ester side groups may constitute 1% or more by weight of the total amount of the resin polymers, e.g. thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples 10% to 40% by weight of the total amount of the resin polymers, e.g. thermoplastic resin polymers, in the liquid electrophotographic composition and/or the ink composition printed on the print substrate, in some examples 5% to 30% by weight of the total amount of the resin polymers, e.g. thermoplastic resin polymers, in the liquid electrophotographic composition and/or the ink composition printed on the print substrate, in some examples 5% to 15% by weight of the total amount of the resin polymers, e.g. thermoplastic resin polymers, in the liquid electrophotographic composition and/or the ink composition printed on the print substrate in some examples 15% to 30% by weight of the total amount of the resin polymers, e.g. thermoplastic resin polymers, in the liquid electrophotographic composition and/or the ink composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the NUCREL® family of toners (e.g. NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 699, NUCREL® 599, NUCREL® 960, NUCREL® RX 76, NUCREL® 2806™, BYNEL® 2002, BYNEL® 2014, BYNEL® 2020 and BYNEL® 2022, (sold by DuPont)), the ACLYN® family of toners (e.g. ACLYN® 201, ACLYN® 246, ACLYN® 285, and ACLYN® 295), and the LOTADER® family of toners (e.g. LOTADER® 2210, LOTADER®3430, and LOTADER® 8200 (sold by Arkema)).

The resin can constitute about 5 to 90%, in some examples about 50 to 80%, by weight of the solids of the liquid electrophotographic composition and/or the ink composition printed on the print substrate. The resin can constitute about 60 to 95%, in some examples about 70 to 95%, by weight of the solids of the liquid electrophotographic composition and/or the ink composition printed on the print substrate.

Carrier Liquid

In some examples, the composition comprises coated pigment particles which are formed in and/or dispersed in a carrier fluid or carrier liquid. Before application to the print substrate in the electrostatic printing process, the composition may be an electrostatic ink composition, which may be in dry form, for example in the form of flowable pigment particles coated with the thermoplastic resin. Alternatively, before application to the print substrate in the electrostatic printing process, the electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In one example, the carrier liquid is a liquid which does not dissolve the polymer resin at room temperature. In one example, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, ISOPAR®-G, ISOPAR®-H, ISOPAR®-L, ISOPAR®-M, ISOPAR®-K, ISOPAR®-V, NORPAR® 12, NORPAR® 13, NORPAR® 15, EXXOL® D40, EXXOL® D80, EXXOL® D100, EXXOL® D130™, and EXXOL® D140™ (each sold by EXXON CORPORATION); TECLEN® N-16, TECLEN® N-20, TECLEN® N-22, Nisseki NAPHTHESOL™ L, Nisseki NAPHTHESOL™ M, Nisseki NAPHTHESOL™ H, #0 Solvent L™, #0 Solvent M™, #0 Solvent H™, Nisseki ISOSOL™ 300, Nisseki ISOSOL™ 400, AF-4™, AF-5™, AF-6™ and AF-7™ (each sold by NIPPON OIL CORPORATION); IP SOLVENT™ 1620 and IP SOLVENT™ 2028 (each sold by IDEMITSU PETROCHEMICAL CO., LTD.); AMSCO™ OMS and AMSCO™ 460 (each sold by AMERICAN MINERAL SPIRITS CORP.); and ELECTRON™, POSITRON™, NEW™ II, PUROGEN™ HF (100% synthetic terpenes) (sold by ECOLINK™).

In the example in which the carrier liquid is acting as a solvent during preparation of the liquid electrophotographic ink composition comprising coated pigment particles, the carrier liquid can constitute about 20% to 99.5% by weight of the composition, in some examples 50% to 99.5% by weight of the composition. In the example in which the carrier liquid is acting as a solvent during preparation of coated pigment particles, the carrier liquid may constitute about 40 to 90% by weight of the composition. In the example in which the carrier liquid is acting as a solvent during preparation of coated pigment particles, the carrier liquid may constitute about 60% to 80% by weight of the composition. In the example in which the carrier liquid is acting as a solvent during preparation of coated pigment particles, the carrier liquid may constitute about 90% to 99.5% by weight of the composition, in some examples 95% to 99% by weight of the composition.

Before printing, the carrier liquid can constitute about 20% to 99.5% by weight of the electrostatic ink composition, in some examples 50% to 99.5% by weight of the electrostatic ink composition. Before printing, the carrier liquid may constitute about 40 to 90% by weight of the electrostatic ink composition. Before printing, the carrier liquid may constitute about 60% to 80% by weight of the electrostatic ink composition. Before printing, the carrier liquid may constitute about 90% to 99.5% by weight of the electrostatic ink composition, in some examples 95% to 99% by weight of the electrostatic ink composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Charge Director and Charge Adjuvant

The liquid electrophotographic composition and/or the ink composition printed on the print substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, but not limited to, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium PETRONATE™, neutral Barium PETRONATE™, and basic Barium PETRONATE™), polybutylene succinimides (e.g. OLOA™ 1200 and Amoco AMOCO™ 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula
$[R_a—O—C(O)CH_2CH(SO_3^-)C(O)—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO_3^{3-}$, $NO_3^-$, $HPO_4^{2-}$, $CO_3^{2-}$, acetate, trifluoroacetate (TFA), $Cl^-$, $Bf^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of the electrostatic ink composition and/or ink composition printed on the print substrate. The charge director can constitute about 0.001 to 0.15% by weight of the solids of the liquid electrophotographic ink composition and/or ink composition printed on the print substrate, in some examples 0.001 to 0.15%, in some examples 0.001 to 0.02% by weight of the solids of the liquid electrophotographic ink composition and/or ink composition printed on the print substrate. In some examples, the charge director imparts a negative charge on the electrostatic ink composition. The particle conductivity may range from 50 to 500 pmho/cm, in some examples from 200-350 pmho/cm.

The liquid electrophotographic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic ink composition and/or ink composition printed on the print substrate. The charge adjuvant can constitute about 0.5 to 4% by weight of the solids of the liquid electrophotographic ink composition and/or ink composition printed on the print substrate. The charge adjuvant can constitute about 1 to 3% by weight of the solids of the liquid electrophotographic ink composition and/or ink composition printed on the print substrate.

Other Additives

The electrophotographic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method of Producing the Liquid Electrophotographic Ink Composition

In some examples, the method of producing a white liquid electrophotographic ink composition involves heating a dispersion of a polymer resin in a carrier fluid to dissolve the polymer resin. In some examples, the polymer resin is insoluble in the carrier fluid at room temperature but soluble in the carrier fluid at elevated temperatures, for example at a temperature of at least 50° C., for example at a temperature of at least 60° C., for example at a temperature of at least 70° C., for example at a temperature of at least 80° C., for example at a temperature of at least 90° C., for example at a temperature of at least 100° C., for example at a temperature of at least 110° C., for example at a temperature of at least 120° C. The dispersion of the polymer resin in the carrier fluid may be heated to any of the above stated temperatures for sufficient time until the polymer resin has dissolved. Dissolution may be confirmed by the carrier fluid appearing clear and homogenous. In some examples, the dispersion of polymer resin in the carrier fluid may be mixed at a rate of less than 500 rpm, for example less than 400 rpm, for example less than 300 rpm, for example less than 200 rpm until dissolution is complete. In some examples, heating a dispersion of polymer resin in carrier fluid causes the polymer resin to swell with carrier fluid. In some examples, the dispersion of polymer resin in carrier fluid is heated to swell the polymer resin. Swelling of the polymer resin allows better encapsulation of the pigment particle.

In some examples, the white pigment particles may be suspended in the carrier fluid before any cooling occurs, for example at the temperature at which dissolution of the polymer resin in the carrier fluid was carried out. In some examples, the carrier fluid may be cooled to an intermediate temperature before the pigment particles are suspended in the carrier fluid. The intermediate temperature may be any temperature above the cloud point of the solution comprising the carrier fluid and the dissolved polymer resin. The cloud point of any given carrier fluid-polymer resin system can be readily determined by heating and slowly cooling the solution and is the temperature at which dissolved solids begin to precipitate, giving a phase separation and a cloudy or turbid appearance. In some examples, the solution comprising the carrier fluid and the dissolved polymer resin is cooled to at least 2° C., for example at least 3° C., for example at least 4° C., for example at least 5° C., for example at least 6° C., for example at least 7° C., for example at least 8° C., for example at least 9° C., for example at least 10° C. above the cloud point before the pigment particle is suspended in the carrier fluid.

In some examples, the pigment particles are mixed into the solution of the polymer resin dissolved in the carrier fluid at a shear rate of 12 000 rpm or less, for example 11 000 rpm or less, for example 10 000 rpm or less, for example 9000 rpm or less to ensure complete dispersion before the precipitation of the polymer resin is effected. In other examples, the pigment particles are mixed into the solution of the polymer resin dissolved in the carrier fluid at a shear rate of 100 rpm or less, for example 90 rpm or less, for example 80 rpm or less, for example 70 rpm or less, for example 60 rpm or less, for example 50 rpm or less to ensure complete dispersion before the precipitation of the polymer resin is effected. In some examples, following dispersion of the pigment particles at a low shear rate, the rate of mixing may be increased to less than 100 rpm, for example less than 90 rpm, for example less than 80 rpm, for example 70 rpm or less. In some examples, following dispersion of the pigment particles, the rate of mixing may be lowered to less than 500 rpm, for example less than 400 rpm, for example less than 300 rpm, for example less than 200 rpm, for example 100 rpm or less, for example less than 90 rpm, for example less than 80 rpm, for example less than 70 rpm, for example less than 60 rpm, for example 50 rpm or less while precipitation is effected.

The precipitation is effected by controlling the cooling of the system by any method such that solubility of the resin in the carrier fluid is reduced and precipitation of the resin occurs. In some examples, the temperature of the carrier fluid is lowered through a controlled cooling process at a given rate. For example, after addition of the pigment particles, the temperature of the carrier fluid may be lowered at a rate of less than 5° C. per hour, for example less than 4° C. per hour, for example less than 3° C. per hour, for example less than 2° C. per hour, for example less than 1° C. per hour.

In some examples, precipitation is effected through controlled cooling through the cloud point of the polymer resin-carrier fluid system. For example, the controlled cooling at a rate of less than 3° C./hour may be carried out beginning at a temperature of 5° C. above the cloud point of the solution and continued until a temperature of at least 5° C. below the cloud point of the solution. In some examples, once the temperature has been lowered in a controlled manner to at least 5° C. below the cloud point of the solution, the system is then cooled at an uncontrolled rate to room temperature.

In some examples, the effecting precipitation involves controlling cooling through addition of further carrier fluid at a controlled rate. For example, the further carrier fluid may be added at a rate of less than 10 cm$^3$/min, for example less than 9 cm$^3$/min, for example less than 8 cm$^3$/min, for example less than 7 cm$^3$/min, for example less than 6 cm$^3$/min, for example less than 5 cm$^3$/min, for example less than 4 cm$^3$/min, for example less than 3 cm$^3$/min. In some examples, a sufficient amount of additional carrier fluid is added at a controlled rate in order to effect phase separation, or effect precipitation. In some examples, once precipitation is complete, the system is cooled at an uncontrolled rate to room temperature.

In some examples, following precipitation of the resin from the carrier fluid, the composition comprising polymer resin-coated pigment particles in carrier fluid may be subjected to a grinding treatment. The grinding treatment may comprise grinding the composition at a temperature of less than 100° C., for example less than 90° C., for example less than 80° C., for example less than 70° C., for example less than 60° C., for example less than 50° C., for example 40° C. or less. The grinding treatment may comprise grinding the composition at a speed of less than 500 rpm, for example less than 400 rpm, for example less than 300 rpm, for example 250 rpm or less. The grinding treatment may comprise grinding the composition at a NVS content of less than 40%, for example less than 30%, for example less than 20%, for example 18% or less. The grinding treatment may comprise grinding the composition for less than 12 hours, for example less than 6 hours, for example less than 5 hours, for example less than 4 hours, for example less than 3 hours, for example 2 hours or less. The grinding treatment may comprise grinding the composition until a desired particle size is obtained.

In some examples, the composition resulting from the precipitation of the resin from the carrier fluid is suitable for use as or is converted to an electrostatic ink composition, before or after the optional grinding step. The electrostatic ink composition may be a dry toner or an liquid toner composition. The electrostatic ink composition may comprise coated particles comprising the resin and the pigment particles. In some examples, a particle comprises pigment particles having a coating of the resin thereon. In some examples, the coating of resin on the pigment particles partially or completely encapsulates the pigment particles. In some examples, the electrostatic ink composition may comprise particles comprising the resin and the pigment particles, wherein at least some of the pigment particles are completely encapsulated by the coating of the resin. In some examples, the composition resulting from the precipitation of the resin from the liquid carrier is suitable for use as or is converted to an electrostatic ink composition by removing the liquid to leave dry particles, comprising the resin and the coated pigment particles. The particles may be capable of developing a charge from the nature of the resin, e.g. if the resin has acidic side groups, to become chargeable particles. In some examples, an electrostatic ink composition may comprise a charge director. In some examples, a charge director may be present in the carrier liquid before precipitation of the resin. In some examples, a charge director is added during or after precipitation of the resin. In some examples, a charge director is added to the composition resulting from the precipitation of the resin from the liquid carrier to convert it to an electrostatic ink composition.

In some examples, the pigment particles, excluding any coating thereon, constitute 25% or less by weight of the solids in the electrostatic ink composition or composition resulting from the method, which may be an electrostatic ink composition. In some examples, the pigment particles, excluding any coating thereon, constitute 12% or less by weight, in some examples 10% or less by weight, in some examples 8% or less by weight of the solids in the electrostatic ink composition or composition resulting from the method, which may be an electrostatic ink composition. In some examples, the pigment particles, excluding any coating thereon, constitute 1% or more by weight, in some examples 2% or more by weight, in some examples 4% or more by weight, in some examples 6% or more by weight by weight, in some examples 8% or more by weight, of the solids in electrostatic ink composition or composition resulting from the method, which may be an electrostatic ink composition.

In some examples, the pigment particles, including any coating thereon, constitute 25% or less by weight of the solids in the electrostatic ink composition or composition resulting from the method, which may be an electrostatic ink composition. In some examples, the pigment particles, including any coating thereon, constitute 12% or less by weight, in some examples 10% or less by weight, in some examples 8% or less by weight of the solids in the electrostatic ink composition or composition resulting from the method, which may be an electrostatic ink composition. In some examples, the pigment particles, including any coating thereon, constitute 1% or more by weight, in some examples 2% or more by weight, in some examples 4% or more by weight, in some examples 6% or more by weight by weight, in some examples 8% or more by weight, of the solids in electrostatic ink composition or composition resulting from the method, which may be an electrostatic ink composition.

The present disclosure further relates to a liquid electrophotographic ink composition producible in accordance with a method described herein.

In some examples, the composition resulting from the precipitation of the resin from the liquid carrier is suitable for use as or is converted to a liquid electrophotographic ink composition.

In some examples, the white liquid electrophotographic ink composition may be formed using a white pigment particle and a polymer resin as previously described. In one example, the white liquid electrophotographic ink composition may comprise white pigment particles coated with a polymer resin, wherein the polymer resin comprises acidic side groups as described previously. In one example, the white liquid electrophotographic ink composition may comprise white pigment particles coated with a polymer resin, wherein the polymer resin is or comprises a polymer having a melt flow rate as described previously.

In some examples, the white liquid electrophotographic ink composition is produced directly from the methods described herein and is usable as a printing composition. In one example, the carrier fluid used in the resin precipitation process is or comprises the carrier fluid used for the pigment resin coated particles in a printing process. Using in the precipitation step a carrier fluid which is also useable as the carrier fluid in a printing process allows for a reduction in manufacturing complexity and thereby increases the efficiency of the process.

In one example, the polymer resin coated white pigment particles may have a median particle size ($d_{50}$) of less than 40 μm, for example less than 30 μm, less than 20 μm, less than 15 μm, less than 10 μm, less than 9 μm, less than 8 μm, about 7 μm.

In one example, the white pigment particles having a polymer resin coating thereon may have a particular median particle size after grinding of the white liquid electrophotographic composition for a given time under standard conditions. For example, the polymer resin coated white pigment particles may have a median particle size of less than 20 μm after grinding for 45 minutes at 40° C., 250 rpm, and 18% non-volatile solids content. Alternatively, the polymer resin coated white pigment particles may have a median particle size of less than 8 μm after grinding for 180 minutes at 40° C., 250 rpm, and 18% non-volatile solids content. Alternatively, the polymer resin coated white pigment particles may have a median particle size of less than 7.5 μm after grinding for 180 minutes at 40° C., 250 rpm, and 18% non-volatile solids content.

In one example, the polymer resin coated white pigment particles may have a percentage of particles having a size greater than 20 μm ("Tail 20") of less than 35%, for example less than 30%, less than 20%, less than 15%, less than 10%, less than 9%, less than 8%, less than 7%, less than 6%.

In one example, the white pigment particles having a polymer resin coating thereon may have a particular percentage of particles having a size greater than 20 μm ("Tail 20") after grinding of the white liquid electrophotographic composition for a given time under standard conditions. For example, the polymer resin coated white pigment particles may have a percentage of particles having a size greater than 20 μm of less than 40% after grinding for 45 minutes at 40° C., 250 rpm, and 18% non-volatile solids content. Alternatively, the polymer resin coated white pigment particles may have a percentage of particles having a size greater than 20 μm of less than 10% after grinding for 180 minutes at 40° C., 250 rpm, and 18% non-volatile solids content. Alternatively, the polymer resin coated white pigment particles may have a percentage of particles having a size greater than 20 μm of less than 7% after grinding for 180 minutes at 40° C., 250 rpm, and 18% non-volatile solids content.

The grinding may be carried out on any commercial attritor, for example an S0, SD-1 or S1 attritor from Union Process. The grinding may be carried out using a metallic grinding media, or a non-metallic grinding media. The grinding media may be or comprise carbon steel, or chrome steel, or stainless steel, or steel shot. The grinding media may be or comprise alumina or other ceramic material such as glass mullite silicon carbide silicon nitride, tungsten carbide zirconium oxide, or zirconium silicate. The grinding media may be or comprise spherical or substantially spherical media, satellites or radius-end cylinders. Satellites will be understood as being substantially spherical with a protruding band around the circumference. The grinding media may be 35 mm or less in diameter, 31 mm or less in diameter, 30 mm or less in diameter, for example 26 mm or less, 25 mm or less, 15 mm or less, 12.7 mm or less in diameter, 10 mm or less, for example 9.5 mm or less, 7.9 mm or less, 5.6 mm or less, 6.4 mm or less, 3.9 mm or less, 3.2 mm or less, 2.4 mm or less, 2 mm or less, for example 1.7 mm or less, 1.4 mm or less, 1 mm or less, 1.18 mm or less, 0.7 mm or less, 0.6 mm or less, 0.5 mm or less, 0.4 mm or less, or 0.25 mm or less in diameter.

The present disclosure also relates to a method of electrostatic printing using an electrostatic ink composition as described herein, which may result from the method described herein, the electrostatic ink composition comprising resin-coated pigment particles, the method comprising:
  forming a latent electrostatic image on a surface;
  contacting the surface with the electrostatic ink composition, such that at least some of the particles adhere to the surface to form a developed toner image on the surface, and transferring the toner image to a print substrate, in some examples, via an intermediate transfer member.

The surface on which the latent electrostatic image is formed may be on a rotating member, e.g. in the form of a cylinder. The surface on which the latent electrostatic image is formed may form part of a photo imaging plate (PIP). The intermediate transfer member may be a rotating flexible member, which may be heated, e.g. to a temperature of from 80 to 130° C. The print substrate may be or comprise a cellulosic print substrate such as paper. The cellulosic print substrate may be or comprise an uncoated cellulosic print substrate, i.e. absent of a coating of a polymeric material. The print substrate may be an acrylic print substrate, in some examples a coated acrylic print substrate, e.g. coated with a styrene-butadiene co-polymer.

EXAMPLES

The following illustrates examples of the methods and related aspects described herein. Thus, these examples should not be considered as limitations of the present disclosure, but are merely in place to teach how to make examples of compositions of the present disclosure. As such, a representative number of compositions and their method of manufacture are disclosed herein.

Liquid Electrophotographic Ink Compositions

Materials
Resins: NUCREL® 599, NUCREL® 699 and NUCREL® 925 are all ethylene-methacrylic acid copolymers available from DuPont. AC-5120 is an ethylene acrylic acid copolymer resin available from Honeywell.

Pigments: SACHTLEBEN® R405 pigment is available from Sachtleben, and TI-PURE® R900 is available from DuPont.

Solvent: ISOPAR®-L is available from Exxon-Mobil.

Example 1

A general procedure for coating pigment particles is described.

To prepare a 1 kg batch of coated particles, 200 g resin, 600 g ISOPAR®-L and 200 g pigment were used.

Dispersed resin in carrier fluid (ISOPAR®-L) is heated to 100° C. and stirred at 200 rpm until fully dissolved and the solution is clear and homogenous. At 100° C., pigment is added and mixed at a rate of 10 000 rpm. An additional 200 g of ISOPAR®-L is then added at a rate of 5-10 cc/min to dilute the solution.

The agitator speed is then reduced to 100 rpm in order not to interrupt the precipitation process. Once phase separation is complete, the disperser is turned off and cooled to room temperature at the maximum cooling rate.

The above process results in approximately 1 kg of ink composition which may be used as or converted to a liquid electrophotographic printing composition at 20% NVS.

The resultant composition is then subjected to a grinding step at 40° C., 250 rpm, 1700 g at 18% NVS for up to 3 hours in an SD-1 laboratory attritor from Union Process, with samples taken at various time points.

Example 2

An alternative process for preparing coating particles is described.

To prepare a 1 kg batch of coated particles, 200 g resin, 600 g ISOPAR®-L and 200 g pigment were used.

The coating procedure takes place in a Kinematica REACTRON® RT2 sealed vessel with anchor mixing blades with scrapers which wipe the surface of the vertical cylindrical vessel wall to create good circulation of the material to be dissolved or dispersed and minimized temperature differential between the wall and the bulk due to disruption of the viscous boundary layer at the wall. It is equipped with a heating jacket to allow the process to be carried out under controlled conditions of temperature programming.

Dispersed resin in carrier fluid (ISOPAR®-L) is heated to 100° C. and stirred at 200 rpm until fully dissolved and the solution is clear and homogenous. At this point the solution is above the cloud point and cooling can begin.

The solution is then cooled without restriction till the temperature is 75° C., corresponding to 5° C. above the cloud point of the system. The pigment is then added and mixed at a high shear rate of 10 000 rpm.

The agitator speed is then reduced to 100 rpm in order not to interrupt the precipitation process and the solution is then very slowly cooled at a rate of between 2-3° C./hr till phase separation has occurred and precipitation of the polymer resin.

The above process results in approximately 1 kg of ink composition which may be used as or converted to a liquid electrophotographic printing composition at 40% NVS.

The resultant composition is then subjected to a grinding step at 40° C., 250 rpm, 1700 g at 18% NVS for up to 3 hours in an SD-1 laboratory attritor from Union Process with samples taken at various time points.

Results

Figure 1B:
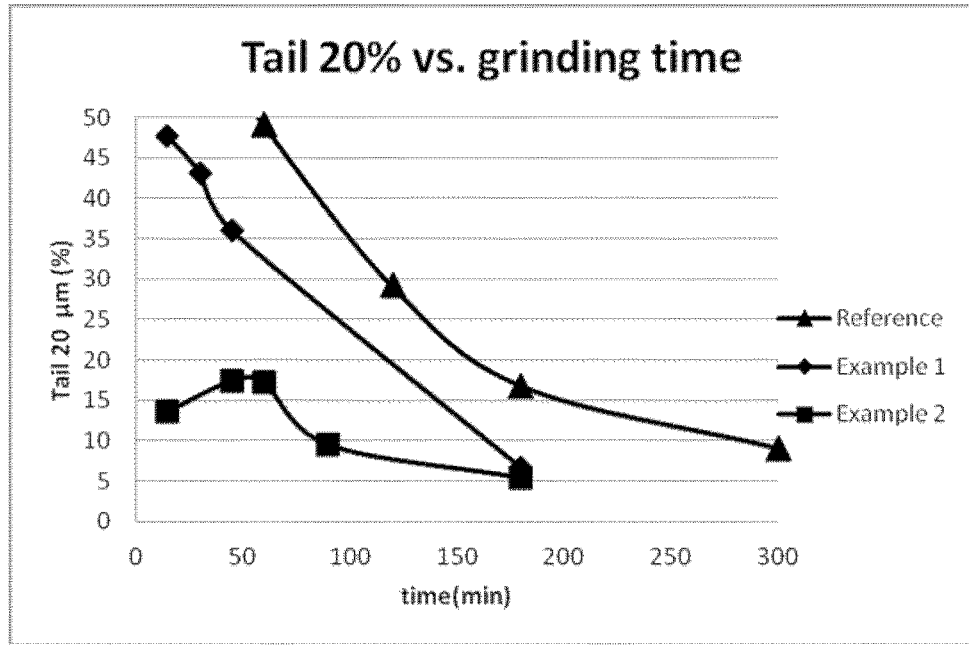
FIG. 1(b) shows the percentage of particles having a particle diameter of greater than 20 microns versus grinding time of Examples 1 and 2 against a reference example.

The median particle sizes ($d_{50}$; FIG. 1(a)) and percentage of particles having a particle diameter of greater than 20 microns (Tail 20%; FIG. 1(a)) of Examples 1 and 2 as a function of grinding time are shown in FIGS. 1(a) and 1(b), respectively, together with a reference ink formed by grinding without the encapsulation/precipitation step. As can be seen, the coated pigment particles formed by precipitation have a much smaller particle size distribution than the reference particles, meaning that less grinding is required to produce a coated pigment particle of a given size. A shorter grinding procedure represents an improved efficiency in the production process.

Figure 2:
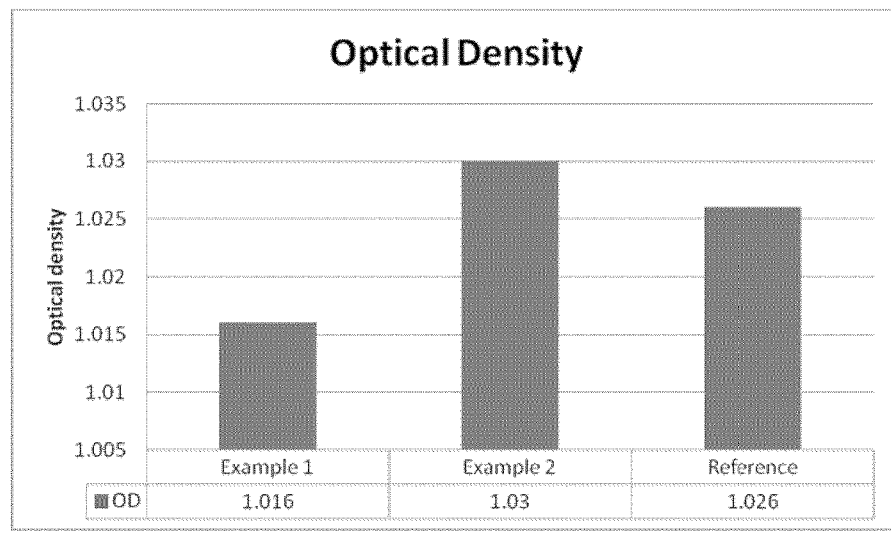
FIG. 2 shows optical density measurements of Examples 1 and 2 against a reference example.
Figure 3:
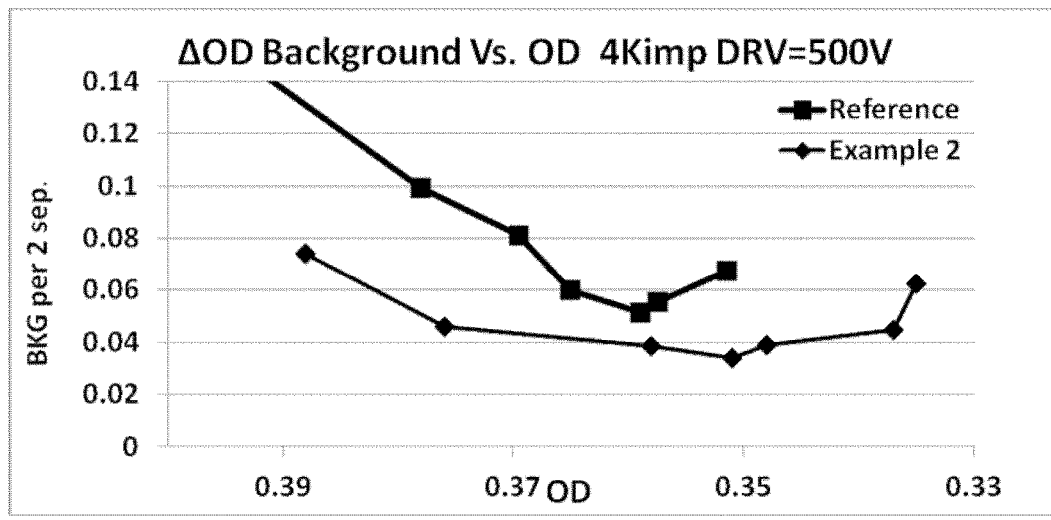
FIG. 3 shows press test background and optical density results of Example 2 against a reference example.

Optical density measurements on a 939 0°/45° portable spectrodensitometer from Xrite show that the reduction in grinding time as a result of the encapsulation via precipitation has no adverse effect on the optical density of these pigments (FIG. 2). The optical density measurements for Examples 1 and 2 were taken after 3 hours of grinding as described above, whereas the measurement for the reference example was taken after 5 hours of grinding. Furthermore, printing two separations of a precipitated ink formulation on a HP WS6000 Digital Press showed that the precipitated ink composition according to Example 2 has lower background levels and the ability to reach lower optical densities within a wider operational window when compared to a reference ink prepared by grinding (FIG. 3).

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

The invention claimed is:

1. A method of producing a white liquid electrophotographic ink composition, the method comprising:
   heating a polymer resin in a carrier fluid to dissolve the polymer resin;
   suspending in the carrier fluid white pigment particles to be coated; and
   controlling cooling of the carrier fluid to effect precipitation of the polymer resin from the carrier fluid such that a coating of the resin is formed on the pigment particles, thereby producing the white liquid electrophotographic ink composition, wherein the precipitation is effected by controlled addition of extra carrier fluid at a rate of less than 10 cm$^3$/min.

2. The method according to claim 1, wherein the carrier fluid is or comprises an isoparaffinic carrier fluid.

3. The method according to claim 1, wherein the carrier fluid is heated to at least 100° C. to dissolve the polymer resin.

4. The method according to claim 1, further comprising grinding the polymer resin coated white pigment particles.

5. The method according to claim 4 wherein:
   the white liquid electrophotographic ink composition has 18% non-volatile solids content; and
   the grinding is accomplished at 40° C. and 250 rpm for up to 3 hours.

6. The method according to claim 5 wherein the grinding is accomplished for 45 minutes.

7. The method according to claim 5 wherein the polymer resin coated white pigment particles have a median particle size ($d_{50}$) of less than 20 μm after the grinding.

8. The method according to claim 1, further comprising adding a charge director:
  to the carrier liquid before precipitation of the polymer resin; or
  to the carrier liquid during precipitation of the polymer resin; or
  to the carrier liquid after precipitation of the polymer resin.

9. The method according to claim 1 wherein the white pigment particle comprises surface modifying groups to increase hydrophobicity.

10. The method according to claim 1 wherein the white pigment particles are selected from the group consisting of $TiO_2$, calcium carbonate, zinc oxide, and mixtures thereof.

11. A method of producing a white liquid electrophotographic ink composition, the method comprising:
  heating a polymer resin in a carrier fluid to dissolve the polymer resin;
  suspending in the carrier fluid white pigment particles to be coated; and
  controlling cooling of the carrier fluid to effect precipitation of the polymer resin from the carrier fluid such that a coating of the resin is formed on the pigment particles, thereby producing the white liquid electrophotographic ink composition, wherein precipitation is effected by cooling the carrier fluid containing dissolved polymer resin and suspended pigment particles at a rate of less than 5° C. per hour.

12. The method according to claim 11, wherein the precipitation is effected by cooling the carrier fluid containing dissolved polymer resin and suspended pigment particles at a rate of less than 3° C. per hour.

* * * * *